US006096257A

United States Patent [19]

Okabe et al.

[11] Patent Number: 6,096,257

[45] Date of Patent: Aug. 1, 2000

[54] METHOD FOR INJECTION MOLDING A CONNECTOR

[75] Inventors: Toshiaki Okabe, Shizuoka; Kouichi Shirouzu, Aichi, both of Japan

[73] Assignee: Yazaki Corporation, Tokyo, Japan

[21] Appl. No.: 09/286,295

[22] Filed: Apr. 6, 1999

Related U.S. Application Data

[62] Division of application No. 09/096,352, Jun. 12, 1998, Pat. No. 5,938,481.

[30] Foreign Application Priority Data

Jun. 12, 1997 [JP] Japan .................................... 9-155351

[51] Int. Cl.[7] .................................................... B29C 45/00

[52] U.S. Cl. ....................... 264/318; 264/328.1; 425/577; 425/DIG. 58

[58] Field of Search ................................ 264/318, 328.1, 264/334; 425/577, DIG. 58, 468, 556; 249/63, 64

[56] References Cited

U.S. PATENT DOCUMENTS

| | | | |
|---|---|---|---|
| 4,187,272 | 2/1980 | Bourdon et al. | 264/318 |
| 4,653,837 | 3/1987 | Phillipson et al. . | |
| 4,711,752 | 12/1987 | Deacon et al. | 264/318 |
| 4,960,394 | 10/1990 | Marks et al. | 264/318 |
| 5,409,404 | 4/1995 | Reed . | |
| 5,897,889 | 4/1999 | Shao | 425/577 |
| 6,024,552 | 2/2000 | Wada et al. | 425/577 |

FOREIGN PATENT DOCUMENTS

| | | |
|---|---|---|
| 0 547 396 A2 | 6/1993 | European Pat. Off. . |
| 2-124673 | 10/1990 | Japan . |
| 5-17952 | 3/1993 | Japan . |
| 5-48271 | 6/1993 | Japan . |
| 5-242923 | 9/1993 | Japan . |
| 5-343122 | 12/1993 | Japan . |

*Primary Examiner*—Jill L. Heitbrink
*Attorney, Agent, or Firm*—Sughrue, Mion, Zinn, Macpeak & Seas, PLLC

[57] ABSTRACT

A connector including a housing which includes terminal receiving grooves in which metal terminals are inserted and received, respectively, from one insertion opening, an upper wall closing upper sides of the terminal receiving grooves, and retaining holes formed in the upper wall in such a manner that the inside and outside of each terminal receiving groove communicate with each other through the associated retaining hole, and a flexible retaining arm, formed on and projecting from the metal terminal, is retainingly engaged in the retaining hole. In the connector, outer grooves are formed in an outer surface of the upper wall, and extend from a fitting face of the housing (for fitting in a mating connector) toward the insertion opening, and inner grooves are formed in an inner surface of the upper wall, and extend from the insertion opening toward the fitting face, and that end of each of the inner grooves close to the fitting face communicates with that end of the associated outer groove close to the insertion opening in a direction of a thickness of the upper wall, thereby forming the retaining hole.

2 Claims, 9 Drawing Sheets

METHOD FOR INJECTION MOLDING A CONNECTOR

This is a divisional of application Ser. No. 09/096,352, filed Jun. 12, 1998, now U.S. Pat. No. 5,938,481 the disclosure of which is incorporated herein by reference.

BACKGROUND OF THE INVENTION

1. Field of the Invention

This invention relates to a connector in which metal terminals each having a flexible retaining arm are received, and also relates to a method for manufacturing the connector.

2. Description of the Related Art

FIG. 8 shows a connector 1 and a metal terminal 3 received in a housing 2 of this connector 1, as disclosed in Japanese Utility Model Unexamined Publication No. Hei. 2-124673. As shown in this Figure, a terminal receiving chamber 4 is formed in the housing 2, and a retaining hole 6 is formed in an upper wall 5 of this terminal receiving chamber 4, so that the inside and outside of the terminal receiving chamber 4 communicate with each other through the retaining hole 6.

The metal terminal 3 is connected by clamping to an end of a wire, and a flexible retaining arm (hereinafter referred to as "lance") 8 is formed by stamping at a contact portion 7 for contact with a mating terminal. When the metal terminal 3 is inserted into the terminal receiving chamber 4 in the housing 2, the lance 8 is engaged with the retaining hole 6, thereby preventing the metal terminal 3 from being withdrawn from the terminal receiving chamber 4.

FIG. 9 shows a connector 9 and a metal terminal 12 received in a housing 10 of this connector 9, as disclosed in Japanese Patent Unexamined Publication No. Hei. 5-343122. As shown in this Figure, a terminal receiving chamber 15 is formed in the housing 10, and a retaining hole 11 is formed in an inner wall of this terminal receiving chamber 15, so that the inside and outside of the terminal receiving chamber 15 communicate with each other through the retaining hole 11.

The metal terminal 12 is connected by clamping to an end of a wire, and a lance 14 is formed by stamping at a contact portion 13 for contact with a mating terminal. When the metal terminal 12 is inserted into the terminal receiving chamber 15 in the housing 10, the lance 14 is engaged with the retaining hole 11, thereby preventing the metal terminal 12 from being withdrawn from the terminal receiving chamber 15.

FIG. 10 shows a metal terminal 16 (disclosed in Japanese Patent Unexamined Publication No. Hei. 5-242923) similar in construction to the metal terminals 3 and 12 disclosed respectively in the above publications. A lance 22 is formed by stamping at that portion of the metal terminal 16 disposed adjacent to a contact portion 17 for contact with a mating terminal. This lance 22 is engaged with a retaining hole formed in an inner wall of a terminal receiving chamber which receives the metal terminal 16, thereby preventing the withdrawal of the metal terminal from the terminal receiving chamber.

However, in the above connector 1 or 9, when forming the retaining hole 6 or 11 in the housing 2 or 10, the retaining hole 6 or 11 corresponds to an undercut portion of a mold, and therefore a slide mold is required for forming the retaining hole 6 or 11.

More specifically, as shown in FIG. 11, when a retaining hole 20 is formed in a direction perpendicular to a direction of withdrawal of a movable mold 19 relative to a fixed mold 18, a slide mold 21 is required for forming the retaining hole 20. Therefore, the cost of the mold is high, and besides since the number of the products which can be molded by one mold is limited, the manufacturing cost has been very high.

SUMMARY OF THE INVENTION

It is therefore an object of this invention to provide a connector and a connector manufacturing method in which a retaining hole can be formed by molding without the use of any slide mold.

To achieve the above object, according to the invention, there is provided a connector comprising a housing including: terminal receiving grooves in which metal terminals are inserted and received, respectively, from one insertion opening; an upper wall closing upper sides of the terminal receiving grooves; and retaining holes formed in the upper wall in such a manner that the inside and outside of each terminal receiving groove communicate with each other through the associated retaining hole, and a flexible retaining arm, formed on and projecting from the metal terminal, is retainingly engaged with the retaining hole, wherein outer grooves are formed in an outer surface of the upper wall, and extend from a fitting face of the housing for fitting in a mating connector toward the insertion opening, and wherein inner grooves are formed in an inner surface of the upper wall, and extend from the insertion opening toward the fitting face, that end of each of the inner grooves close to the fitting face communicating with that end of the associated outer groove close to the insertion opening in a direction of a thickness of the upper wall, thereby forming the retaining hole.

Further, there is provided a connector manufacturing method in which the housing of the connector is molded by injecting a molding material into a cavity between a fixed mold and a movable mold movable toward and away from the fixed mold, comprising the steps of: forming the outer grooves respectively by outer-groove forming portions formed on one of the fixed mold and the movable mold and forming the inner grooves respectively by inner-groove forming portions formed on the other of the two molds in a condition in which the two molds are mated together; and overlapping the outer-groove forming portions with the inner-groove forming portions in a direction intersecting a direction of mating of the two molds, thereby forming the retaining holes.

BRIEF DESCRIPTION OF THE DRAWINGS

FIG. 5(*b*) is a cross-sectional view showing a fixed mold and a movable mold for forming the outer and inner grooves;

FIG. 6(*b*) is a side-elevational view of the metal terminal;

FIG. 6(*c*) is a front-elevational view of the metal terminal;

DETAILED DESCRIPTION OF THE PREFERRED EMBODIMENT

Figure 1:
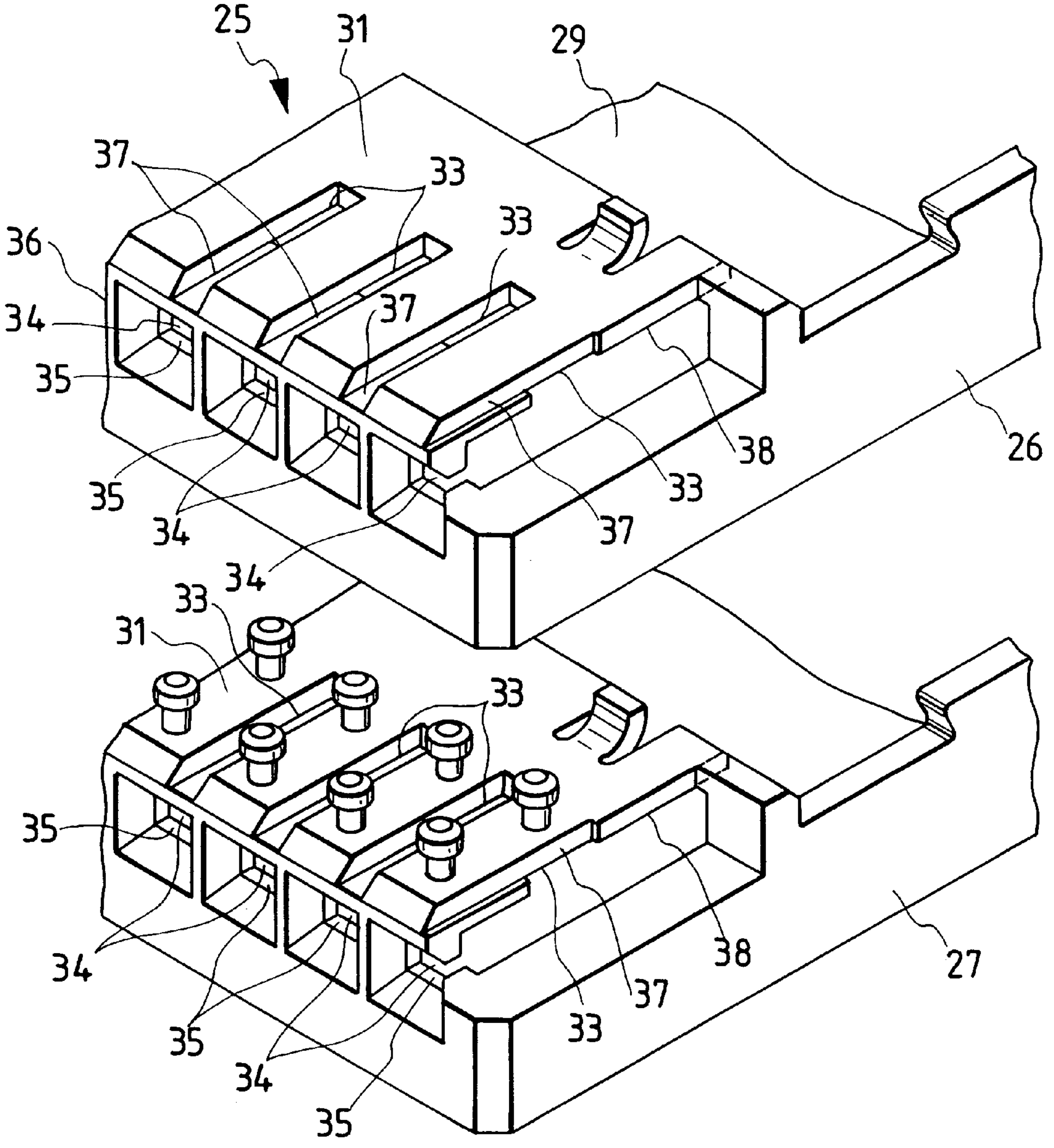
FIG. 1 is a partly-broken perspective view of a preferred embodiment of a connector of the present invention.
Figure 2:
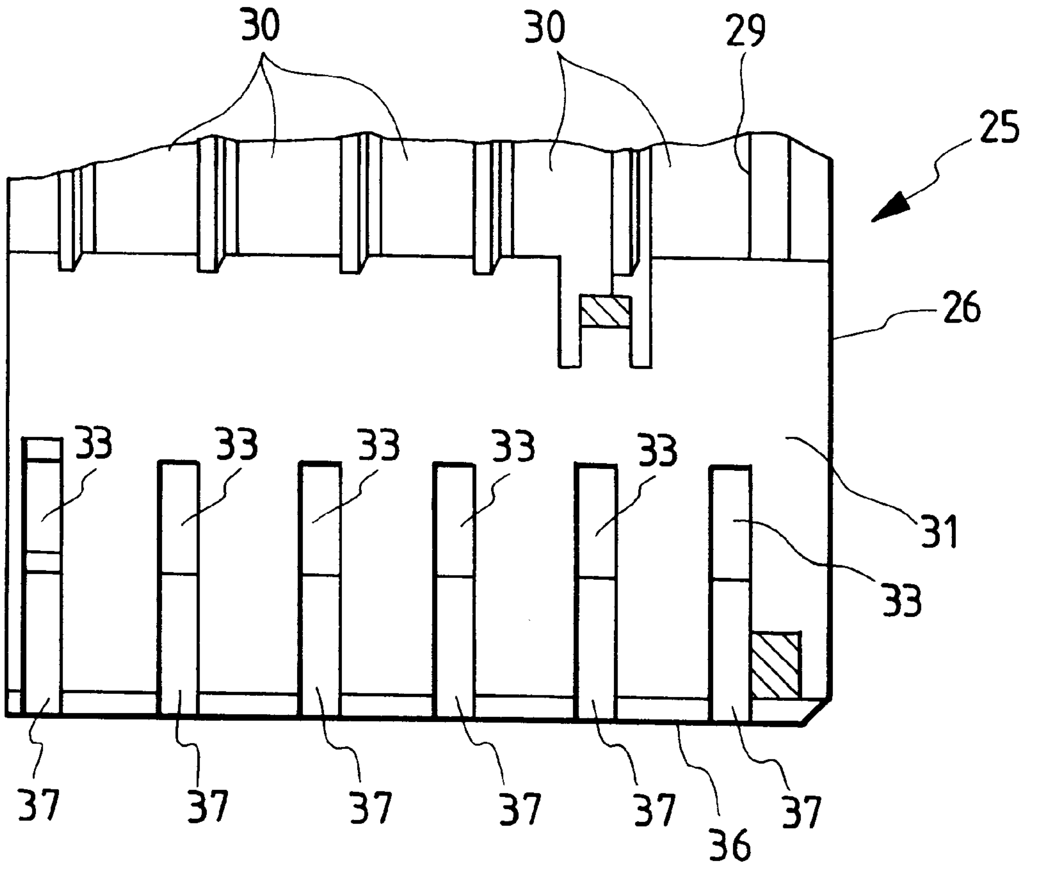
FIG. 2 is a plan view of the connector of the embodiment.
Figure 3:
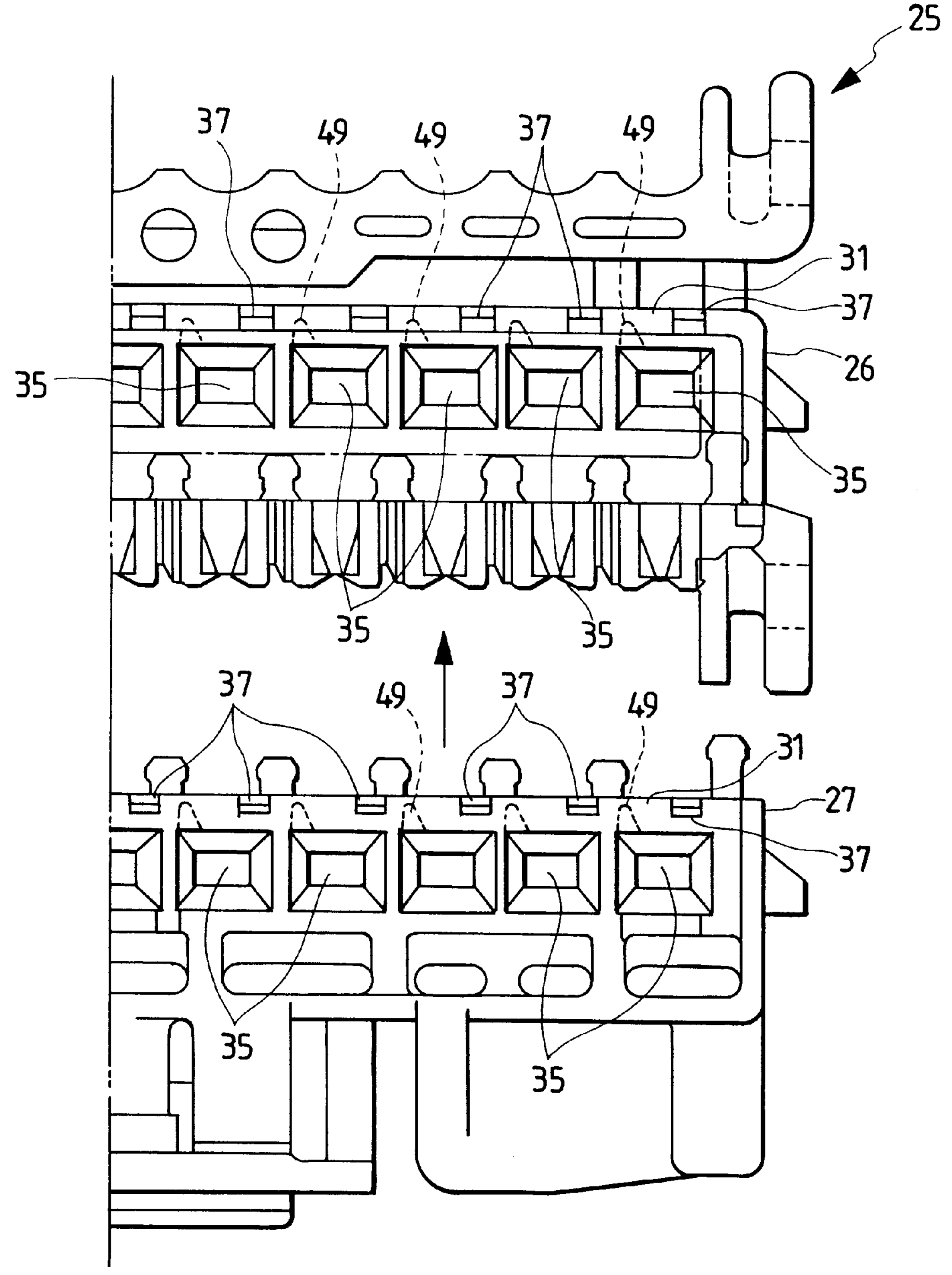
FIG. 3 is a front-elevational view of the connector of the embodiment.
Figure 4:
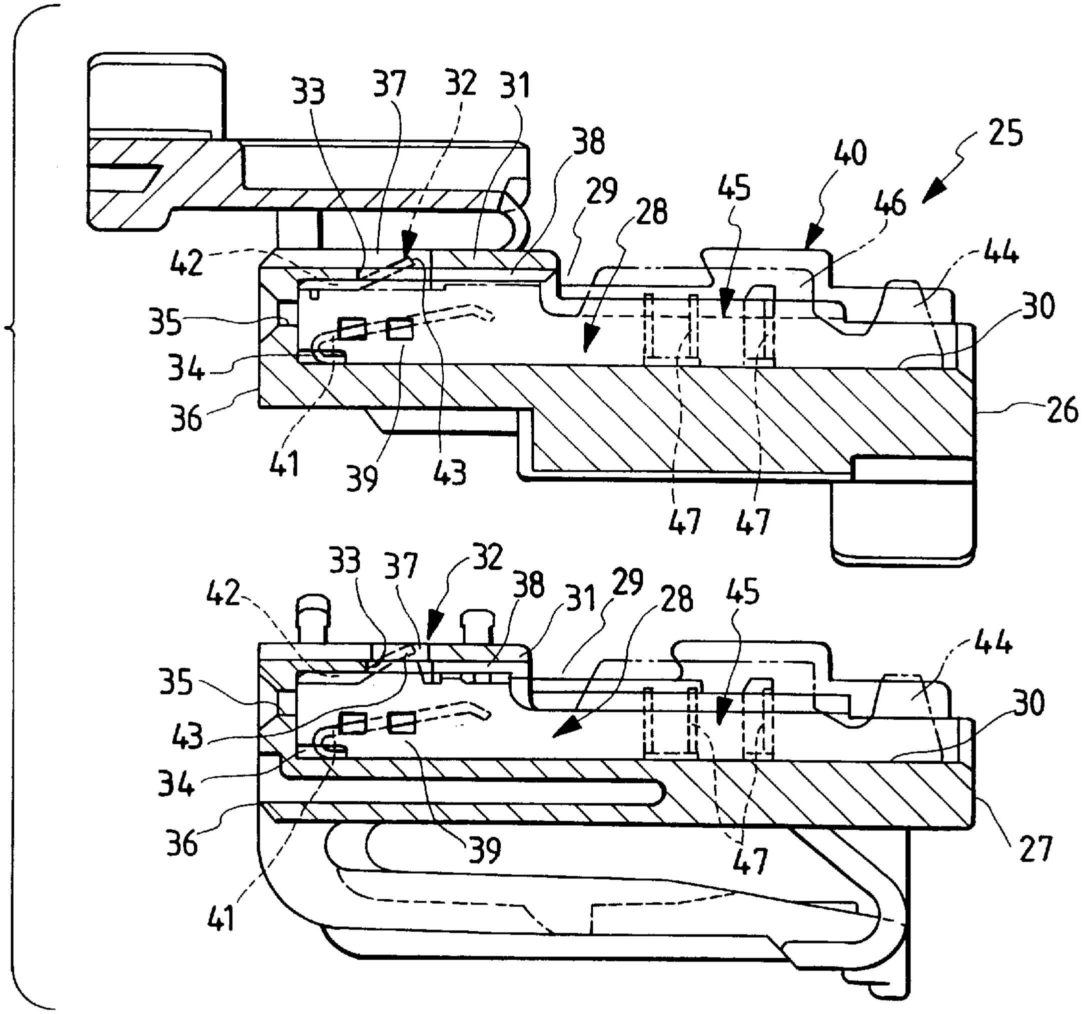
FIG. 4 is a cross-sectional view showing the interior of a housing of the connector of the embodiment.
Figure 5A:
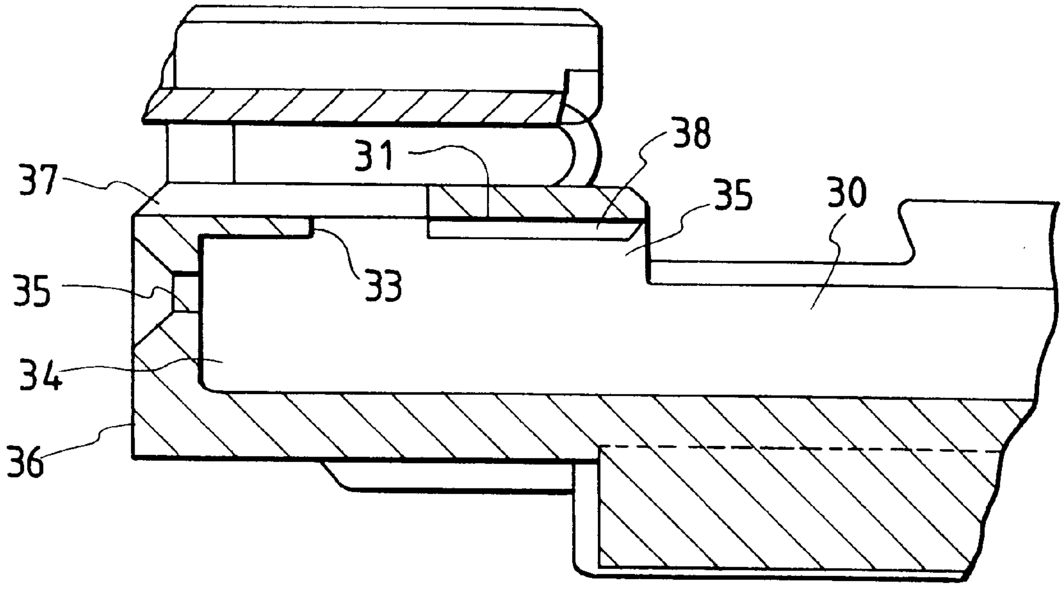
FIG. 5(*a*) is a cross-sectional view of a portion of the housing, showing an outer groove and an inner groove.
Figure 5B:
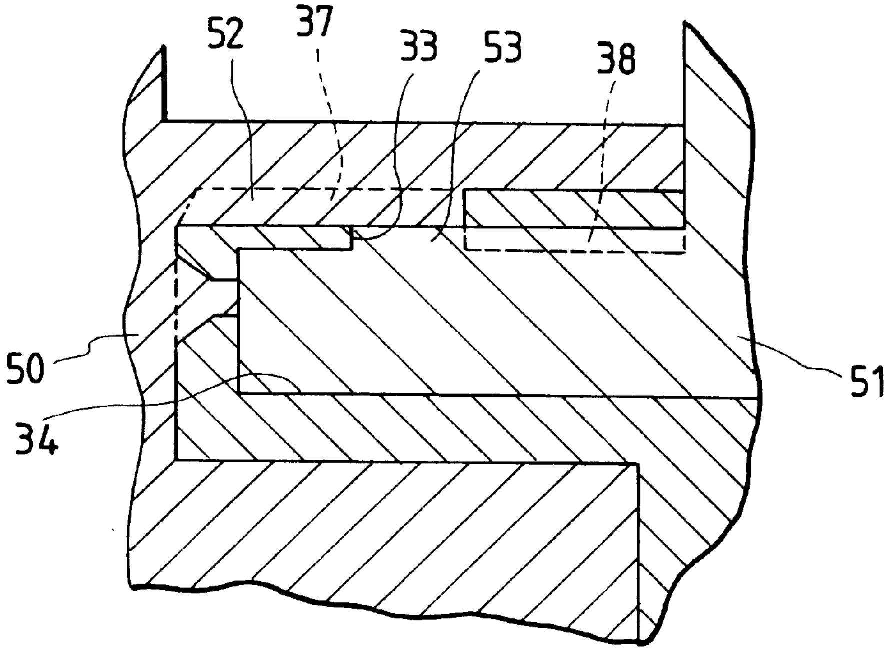
Figure 6A:
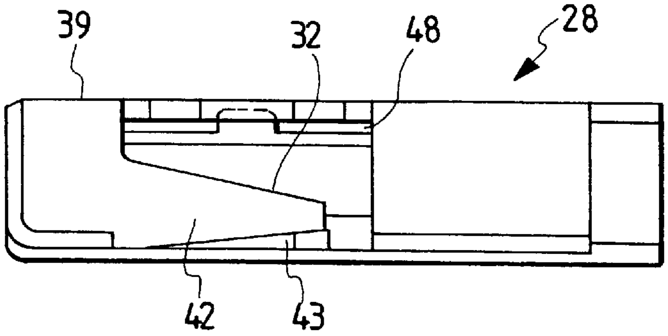
FIG. 6(*a*) is a plan view of a metal terminal to be received in the connector.
Figure 6C:
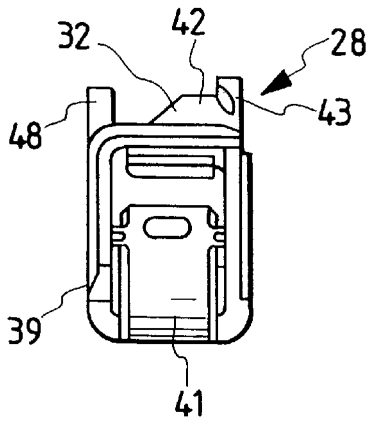
Figure 6B:
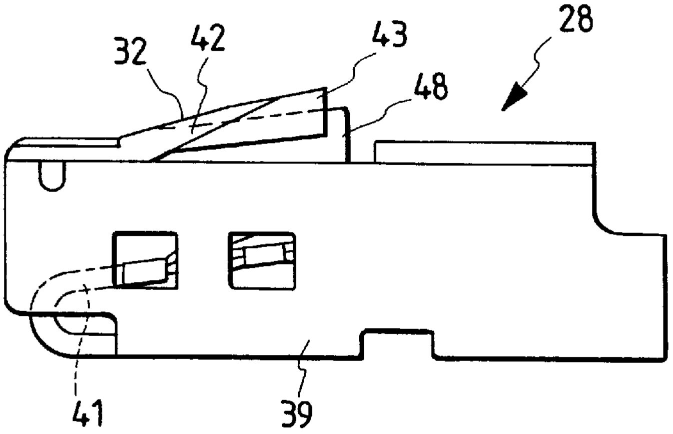
Figure 7:
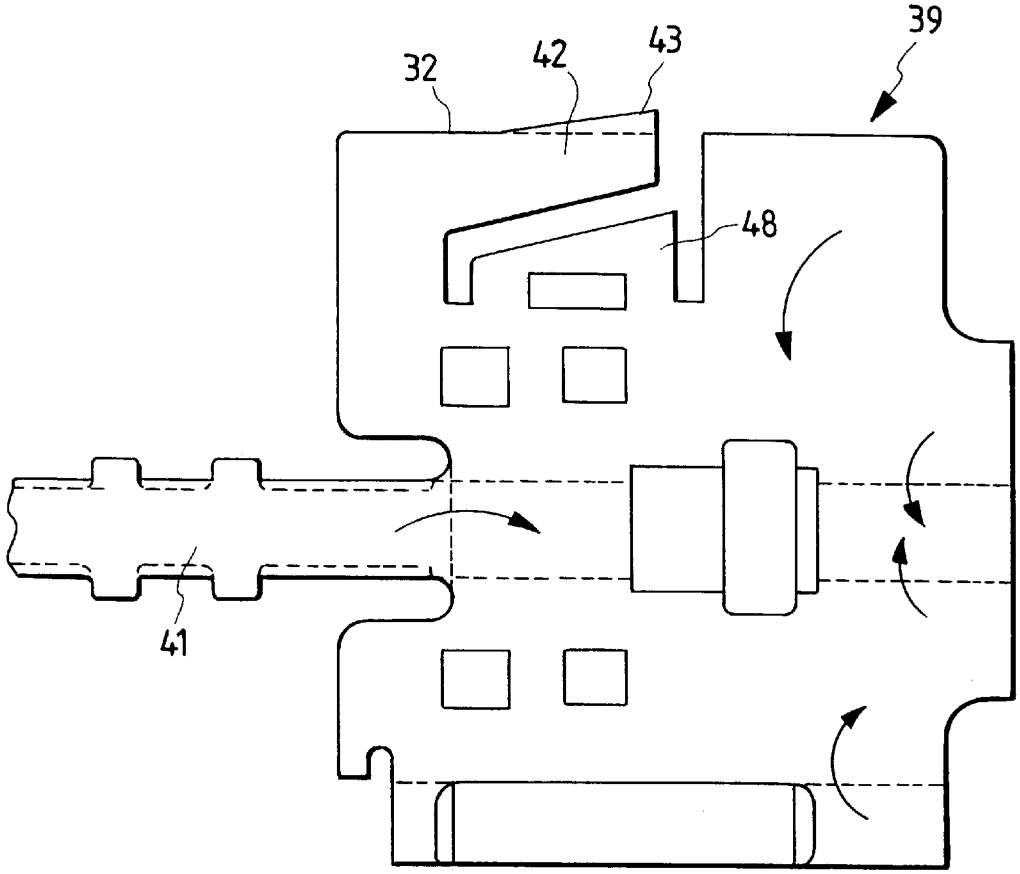
FIG. 7 is a developed view of a contact portion of the metal terminal.
Figure 8:
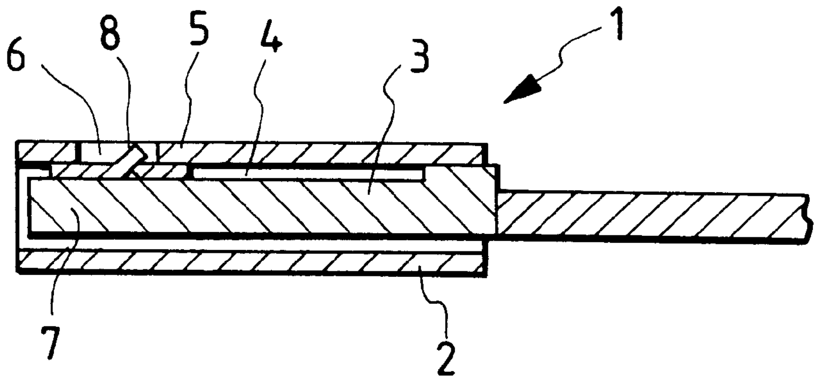
FIG. 8 PRIOR ART
FIG. 8 is a cross-sectional view of a conventional connector.
Figure 9:
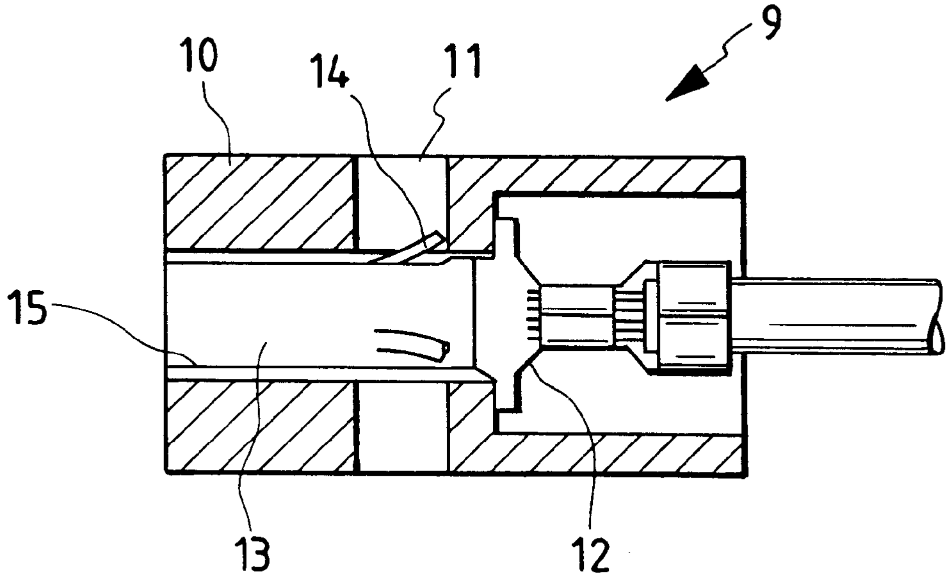
FIG. 9 PRIOR ART
FIG. 9 is a cross-sectional view of another conventional connector.
Figure 10:
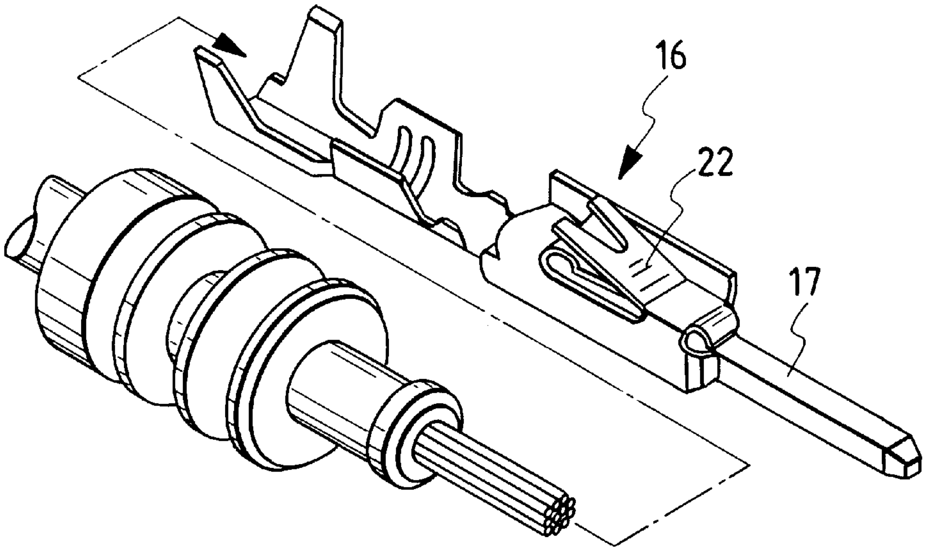
FIG. 10 PRIOR ART
FIG. 10 is a perspective view of a conventional metal terminal.
Figure 11:
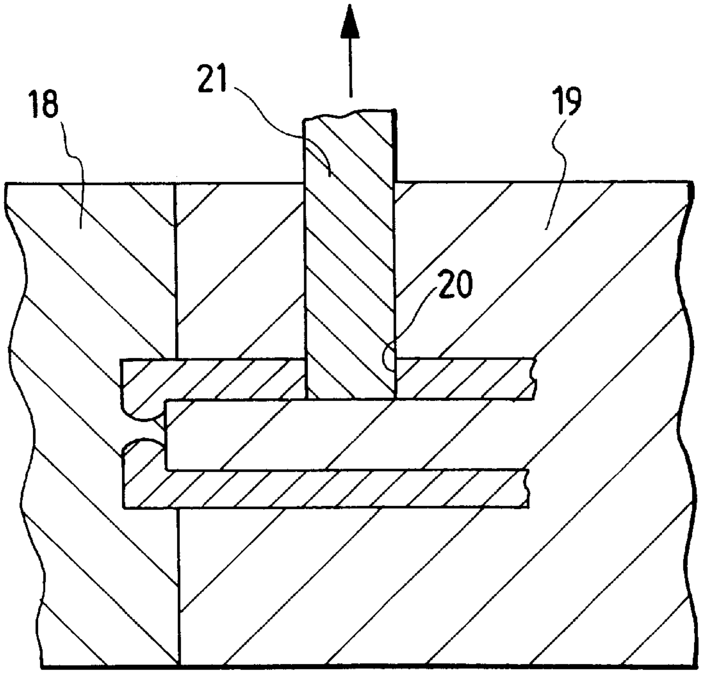
FIG. 11 PRIOR ART
FIG. 11 is a cross-sectional view showing a conventional method of molding a housing of a connector.

A preferred embodiment of a connector of the present invention, as well as a method for manufacturing the connector, will now be described with reference to the drawings. FIGS. 1 to 3 show a connector 25 of this embodiment, and FIG. 4 shows the interior of the connector 25. FIG. 5(*a*) is an enlarged view of a portion of the connector 25, and FIG. 5(*b*) shows a mold for molding the enlarged portion. FIGS. 6(*a*), 6(*b*), 6(*c*) and 7 show a metal terminal 28 to be received in the connector 25.

As shown in FIGS. 1 to 3, the connector 25 comprises two housings 26 and 27 vertically stacked together. These housings 26 and 27 are identical in basic construction to each other, and therefore only the upper housing 26 will be described below, and description of the lower housing 27 will be omitted.

The housing 26 includes terminal receiving grooves 30 in which the metal terminals 28 (see FIGS. 4 and 6(*a*) to 6(*c*)) can be inserted and received, respectively, from an insertion opening 29, an upper wall 31 closing the upper sides of the terminal receiving grooves 30, and retaining holes 33 formed in the upper wall 31 in such a manner that the inside and outside of each terminal receiving groove 30 communicate with each other through the associated retaining hole 33. A flexible retaining arm 32, formed on and projecting from the metal terminal 28, can be retainingly engaged with the retaining hole 33. The terminal receiving groove 30 and the upper wall 31 jointly form a terminal receiving chamber 34. A terminal insertion opening 35 for receiving a mating terminal is formed at that end of the terminal receiving chamber 34 remote from the insertion opening 29.

In the housing 26 of this embodiment, outer grooves 37 are formed in an outer surface of the upper wall 31, and extend from a fitting face 36 of the housing 26 (for fitting in a mating connector) toward the insertion opening 29. As shown in FIG. 4, inner grooves 38 are formed in an inner surface of the upper wall 31, and extend from the insertion opening 29 toward the fitting face 36, and that end (fitting-face-side end) of each inner groove 38 close to the fitting face 36 communicates with that end (insertion-opening-side end) of the associated outer groove 37 close to the insertion opening 29 in a direction of the thickness of the upper wall 31. The retaining hole 33 is formed at that portion where the outer groove 37 and the inner groove 38 communicate with each other.

As shown in FIG. 4, the metal terminal 28 to be received in the terminal receiving groove 30 in the housing 26 has one end portion defining a contact portion 39 for contact with the mating terminal, and also has the other end portion defining a wire connection portion 40 for connection to an end portion of a wire (not shown).

The contact portion 39 is bent into a rectangular cross-section, and has a resilient piece portion 41 formed by inwardly bending a bottom plate. The flexible retaining arm 32 projects from a top plate of the contact portion 39 at one widthwise side portion thereof. As shown in FIGS. 6(*a*), 6(*b*) and 6(*c*), this flexible retaining arm 32 is formed by a plate-like, resilient retaining plate portion 42, projecting from the top plate toward the wire connection portion 40, and a vertical wall 43 formed by substantially perpendicularly bending one widthwise side portion of this resilient retaining plate portion 42. The contact portion 39 further has a positioning piece portion 48 formed at the other widthwise side portion of the top plate.

The wire connection portion 40 has at its rear end portion, wire holding piece portions 44 for holding the end portion of the wire, and a press-connecting portion 45 is formed between the contact portion 39 and the wire holding piece portions 44. This press-connecting portion 45 has a pair of opposed press-connecting blades 47 and 47 which are formed by bending stamped portions of a pair of opposed side walls 46 and 46.

In a condition in which the metal terminal 28 is received in the terminal receiving groove 30 in the housing 26 as shown in FIG. 4, the contact portion 39 of the metal terminal 28 is received in the terminal receiving chamber 34, and the press-connecting portion 45 and the wire holding piece portions 44 are received in the insertion opening 29. The vertical wall 43 of the flexible retaining arm 32 is inserted in the retaining hole 33, and is abutted against an inner wall of the retaining hole 33. In this condition, the end portion of the wire is placed on the press-connecting portion 45, and is press-fitted by a press-connecting jig into a space between the press-connecting blades 47 and 47, thereby connecting the wire end portion to the metal terminal 28.

For introducing the metal terminal 28 into the terminal receiving groove 30 in the housing 26, the contact portion 39 of the metal terminal 28 is inserted from the insertion opening 29, and the contact portion 39 is moved toward the terminal receiving chamber 34. When the contact portion 39 is thus moved toward the terminal receiving chamber 34, the flexible retaining arm 32 abuts against that end of the upper wall 31 close to the insertion opening 29, and therefore is flexed or bent toward the contact portion 39.

In this condition, when the contact portion 39 is further moved, the vertical wall 43 moves in the inner groove 38 while the positioning piece portion 48 moves in a positioning piece portion groove 49 (see FIG. 3). When the contact portion 39 is completely received in the terminal receiving chamber 34, the vertical wall 43 is inserted into the retaining hole 33 because of the resiliency of the flexible retaining arm 32, so that a distal end surface of the vertical wall 43 abuts against the inner wall of the retaining hole 33. As a result, the withdrawal of the metal terminal 28 from the terminal receiving groove 30 is prevented, and the metal terminal 28 is held in the terminal receiving groove 30.

Next, a method for manufacturing the housing 26 of the above connector will be described with reference to FIG. 5(*b*). This housing 26 is molded by injecting a molding material (e.g. a synthetic resin) into a cavity formed between a fixed mold 50 and a movable mold 51. At this time, as shown in FIG. 5(*b*), the outer grooves 37 in the housing 26 are formed by outer-groove forming portions 52 of the fixed mold 50, and the inner grooves 38 are formed by inner-groove forming portions 53 of the movable mold 51.

The fixed mold 50 and the movable mold 51 are mated or connected together, and the outer-groove forming portions 52 respectively overlap the inner-groove forming portions 53 in a direction intersecting the direction (that is, a mold-withdrawing direction) of mating of the molds 50 and 51, and these overlap portions form the retaining holes 33, respectively. Therefore, the retaining holes 33 can be formed by the fixed mold 50 and the movable mold 51 without the use of any slide mold for forming the retaining holes 33. In FIG. 5(*b*), mesh portions indicate the cavity, and the synthetic resin is injected into this cavity so as to form the housing 26.

In the connector 25 of this embodiment, that end of each outer groove 37 close to the insertion opening 29 communicates with that end of the associated inner groove 38 close to the fitting face 36 in the direction of the thickness of the upper wall 31 to thereby form the retaining hole 33, and with this construction the retaining holes 33 can be formed without the use of any slide mold. More specifically, when the molds are mated together, those mold portions for respectively forming the outer grooves 37 respectively overlap those mold portions for respectively forming the inner grooves 38 in the direction intersecting the direction of mating of the molds, and by doing so, the retaining holes can be formed. Therefore, there is no need to provide any slide mold for forming the retaining holes, and the manufacturing cost for molding the housing 26 can be reduced.

In this embodiment, the flexible retaining arm 32 of the metal terminal 28 comprises the resilient retaining plate portion 42 and the vertical wall 43, and the vertical wall 43 abuts against the inner wall of the retaining hole 33, and therefore the strength of the flexible retaining arm against disengagement and buckling is enhanced, and the strength of the metal terminal 28 against withdrawal from the terminal receiving groove 30 is enhanced.

In this embodiment, since the vertical wall 43 is adapted to be inserted in the retaining hole 33, the size of the retaining hole 33 can be reduced, and this lessens the possibility that a foreign matter is accidentally introduced into the retaining hole 33. This prevents the flexible retaining arm 32 from being disengaged from the retaining hole 33.

In this embodiment, although the vertical wall 43 is formed on the flexible retaining arm 32, this vertical wall 43 passes through the inner groove 38, and is inserted into the retaining hole 33, and therefore in contrast with a conventional construction, a gap for passing the vertical wall 43 therethrough does not need to be formed between the upper wall 31 and the terminal receiving groove 30. As a result, the interior of the terminal receiving chamber 34 is not unduly large, and this prevents the metal terminal 28, received in the terminal receiving chamber 34, from shaking or moving.

Although the above embodiment is directed to the connector using the press-connecting terminals (metal terminals), the present invention can be applied to connectors using other types of metal terminals.

As described above, in the invention, the insertion-opening-side end of each outer groove communicates with the fitting-face-side end of the inner groove in the direction of the thickness of the upper wall, thereby forming the retaining hole, and with this construction, the retaining holes can be formed without the use of any slide mold.

Further, in the invention, the vertical wall abuts against the inner wall of the retaining hole, and therefore the strength of the flexible retaining arm against buckling is enhanced, and the strength of the metal terminal against withdrawal from the terminal receiving chamber is enhanced.

Furthermore, in the invention, the outer-groove forming portions respectively overlap the inner-groove forming portions in the direction intersecting the direction of mating of the fixed mold and the movable mold, and these overlap portions form the retaining holes, and the outer groove and inner groove communicate with each other through the retaining hole in the direction of the thickness of the upper wall. Therefore, the retaining holes can be formed without the use of any slide mold, and the manufacturing cost can be reduced.

What is claimed is:

1. A connector manufacturing method in which the housing of a connector, which includes terminal receiving grooves in which metal terminals are inserted and received from a respective insertion opening; an upper wall closing upper sides of said terminal receiving grooves; and retaining holes formed in said upper wall in such a manner that the inside and outside of each terminal receiving groove communicate with each other through the associated retaining hole, and a flexible retaining arm, formed on and projecting from said metal terminal, is retainingly engaged with said retaining hole, wherein outer grooves are formed in an outer surface of said upper wall, and extend from a fitting face of said housing toward the insertion opening, and wherein inner grooves are formed in an inner surface of said upper wall, and extend from the insertion opening toward the fitting face, an end of each of said inner grooves closer to the fitting face communicating through said retaining hole with an end of the associated outer groove close to the insertion opening in a direction of thickness of said upper wall;

is molded by injecting a molding material into a cavity between a fixed mold and a movable mold movable toward and away from said fixed mold, comprising the steps of:

forming said outer grooves respectively by outer-groove forming portions formed on one of said fixed mold and said movable mold and forming said inner grooves respectively by inner-groove forming portions formed on the other of said two molds in a condition in which said two molds are mated together; and overlapping said outer-groove forming portions with said inner-groove forming portions in a direction intersecting a direction of mating of said two molds, thereby forming said retaining holes.

2. A method of manufacturing a connector including a connector housing having a plurality of terminal receiving grooves and including an upper wall partially defining said terminal receiving grooves and having retaining holes formed therein for respectively receiving retaining arms of terminals received in said terminal receiving grooves, said upper wall having outer grooves extending in one direction and inner grooves extending in an opposite direction that communicate with each other at overlap portions which define said retaining holes, said method comprising the following steps:

providing a fixed mold and a movable mold movable toward and away from said fixed mold;

forming outer groove forming portions on one of said fixed mold and said movable mold and forming inner groove forming portions on the other of said two molds;

moving said fixed mold and said movable mold toward each other to form a cavity in which said outer groove forming portions are overlapped with said inner groove forming portions in a direction intersecting a direction of mating of said two molds; and injecting a molding material into said cavity to thereby form said connector housing with said retaining holes being located where said inner groove forming portions are overlapped with said outer groove forming portions.

* * * * *